(12) United States Patent
Savithri

(10) Patent No.: US 9,372,948 B1
(45) Date of Patent: Jun. 21, 2016

(54) INTERCONNECT SPEED MODEL CHARACTERIZATION IN PROGRAMMABLE INTEGRATED CIRCUITS

(71) Applicant: Xilinx, Inc., San Jose, CA (US)

(72) Inventor: Nagaraj Savithri, Plano, TX (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/730,609

(22) Filed: Jun. 4, 2015

(51) Int. Cl.
*H03K 19/00* (2006.01)
*G06F 17/50* (2006.01)
*G01R 31/317* (2006.01)
*G01R 31/28* (2006.01)
*G01R 31/3185* (2006.01)

(52) U.S. Cl.
CPC ........ *G06F 17/5031* (2013.01); *G01R 31/2834* (2013.01); *G01R 31/31725* (2013.01); *G01R 31/318594* (2013.01); *G06F 17/5054* (2013.01)

(58) Field of Classification Search
CPC .............. H03L 7/0995; G06F 17/5031; G06F 17/5045; G06F 1/04; G06F 17/5054; G06F 2217/84; H03K 19/17792; H03K 3/0315; H03K 19/017581; H03K 19/17764; H03K 2005/00247; H03K 5/133; G01R 31/2824; G01R 31/3016; G01R 31/318519; G01R 31/31858; G01R 31/318594; G11C 29/50012; H01L 22/34; Y10S 331/03
See application file for complete search history.

(56) References Cited

U.S. PATENT DOCUMENTS 6,657,504 B1 * 12/2003 Deal .................. G01R 31/2824
324/762.02
7,728,642 B1 * 6/2010 O'Dwyer ............... H03K 5/135
327/265

* cited by examiner

*Primary Examiner* — Vibol Tan
(74) *Attorney, Agent, or Firm* — Keith Taboado; Robert M. Brush; Joshua Hamberger

(57) ABSTRACT

Techniques for using a speed measurement circuit to measure speed of an integrated circuit. The speed measurement circuit includes a ring oscillator and a counter circuit. The ring oscillator includes an AND gate with an inverting input and a non-inverting input. The ring oscillator also includes a programmable interconnect point context (PIP-context) having a first programmable interconnect point (PIP), a first interconnect, a second PIP, and a second interconnect coupled in series. The ring oscillator also includes a third interconnect and a third PIP coupled in series with the PIP-context and with an inverting input of the AND gate. The counter circuit is coupled to an output of the AND gate and configured in the programmable integrated circuit.

20 Claims, 5 Drawing Sheets

US 9,372,948 B1

INTERCONNECT SPEED MODEL CHARACTERIZATION IN PROGRAMMABLE INTEGRATED CIRCUITS

TECHNICAL FIELD

Examples of the present disclosure generally relate to programmable integrated circuits and, in particular, to techniques for interconnect speed model characterization in programmable integrated circuits.

BACKGROUND

Programmable integrated circuits such as field programmable gate arrays offer a large amount of flexibility in that a single device may be configured to implement a wide array of different circuits. Part of the design process for programmable integrated circuits is speed modeling, which involves, among other things, obtaining accurate speed parameters for various components of the programmable integrated circuit. These parameters may be important for improving circuit model design and for simply characterizing the speed of the programmable integrated circuit as a whole.

In the past, techniques for measuring speed parameters of a programmable integrated circuit involved relatively large circuits with a large number of delay elements. Such circuits may suffer from inaccuracies, both in that the speed measurements taken are inaccurate and that the number of speed parameters that can be measured is a low percentage of the total number of speed parameters in a programmable integrated circuit. For these reasons, improved techniques for measuring speed parameters of programmable integrated circuits are needed.

SUMMARY

A speed measurement circuit for measuring speed parameters of a programmable integrated circuit is provided. The speed measurement circuit includes a ring oscillator configured in the programmable integrated circuit. The ring oscillator includes an AND gate with an inverting input and a non-inverting input. The ring oscillator also includes a programmable interconnect point context (PIP-context) having a first programmable interconnect point (PIP), a first interconnect, a second PIP, and a second interconnect coupled in series. The ring oscillator also includes a third interconnect and a third PIP coupled in series with the PIP-context and with an inverting input of the AND gate. The speed measurement circuit also includes a counter circuit coupled to an output of the AND gate and configured in the programmable integrated circuit.

A speed analysis system for characterizing speed of a programmable integrated circuit is also provided. The speed analysis system includes a central processing unit (CPU) coupled to a memory storing instructions for execution of an integrated circuit model module, a modification module, and a test module by the CPU. The integrated circuit model module is operable to store a circuit model for configuring in the programmable integrated circuit and to store a speed model that includes data characterizing speed of programmable interconnect point contexts (PIP-contexts) associated with the programmable integrated circuit. The modification module is also operable to generate a first model of a speed measuring circuit for configuration into the programmable integrated circuit and to store the first model in the circuit model. The test module is operable to measure speed of a first PIP-context associated with the first model when the first model is configured into the integrated circuit. The speed measuring circuit includes a ring oscillator and a counter circuit. The ring oscillator includes an AND gate with an inverting input and a non-inverting input. The ring oscillator also includes the first PIP-context, having a first programmable interconnect point (PIP), a first interconnect, a second PIP, and a second interconnect coupled in series. The ring oscillator further includes a third interconnect and a third PIP coupled in series with the PIP-context and with an inverting input of the AND gate. The counter circuit is coupled to an output of the AND gate and configured in the programmable integrated circuit.

A method for measuring speed parameters of a programmable integrated circuit is provided. The method includes generating a first model of a speed measuring circuit. The method also includes configuring the first model into the programmable integrated circuit. The method further includes measuring speed of a first PIP-context associated with the first model. The speed measuring circuit includes a ring oscillator and a counter circuit. The ring oscillator includes an AND gate with an inverting input and a non-inverting input. The ring oscillator also includes the first PIP-context, having a first programmable interconnect point (PIP), a first interconnect, a second PIP, and a second interconnect coupled in series. The ring oscillator further includes a third interconnect and a third PIP coupled in series with the PIP-context and with an inverting input of the AND gate. The counter circuit is coupled to an output of the AND gate and configured in the programmable integrated circuit.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting in scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
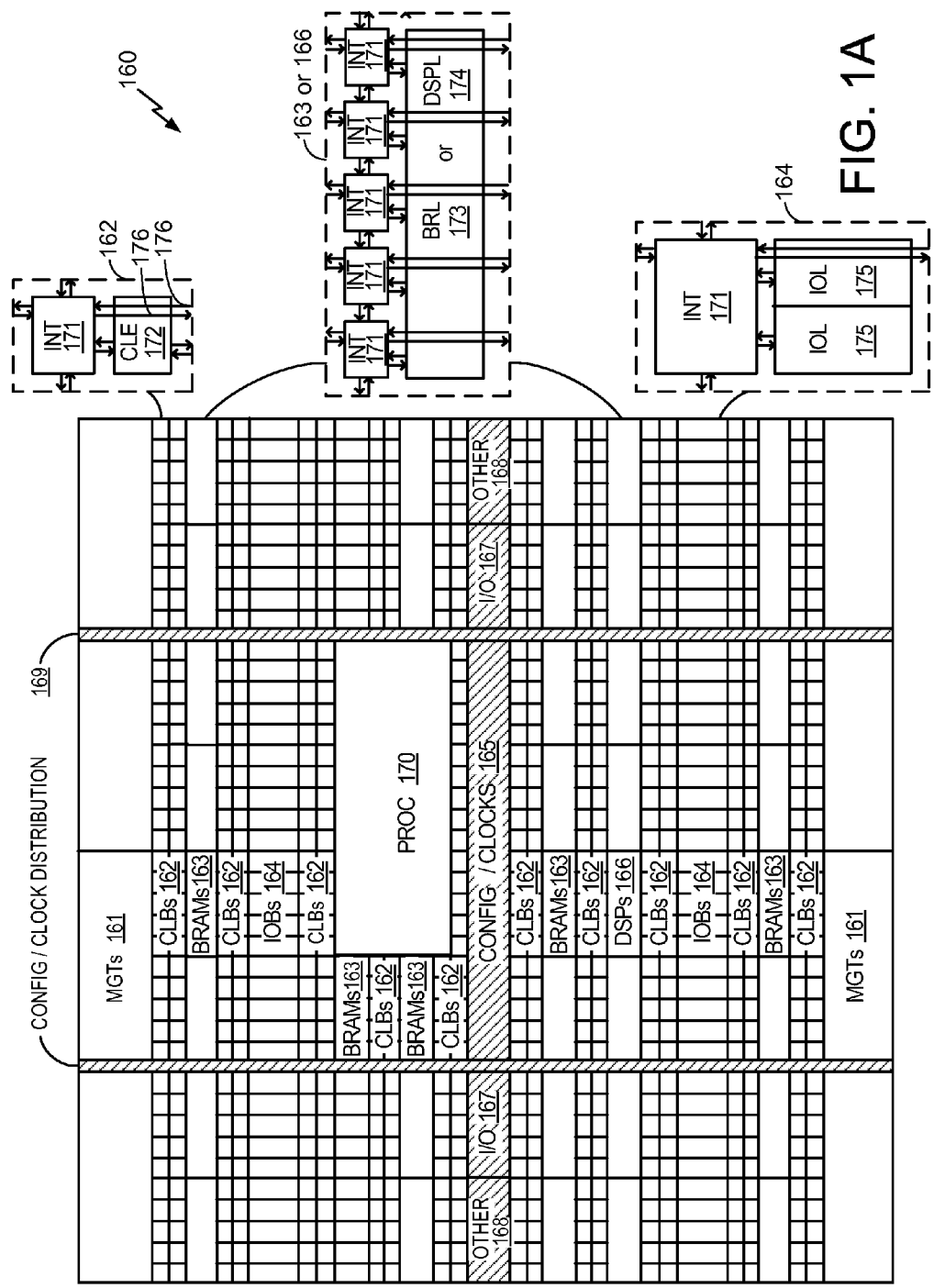
FIG. 1A illustrates an integrated circuit, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

In the past, techniques for measuring speed parameters of a programmable integrated circuit involved relatively large circuits with a large number of delay elements. Such circuits may suffer from inaccuracies, both in that the speed measurements taken are inaccurate and that the number of speed parameters that can be measured is a low percentage of the total number of speed parameters in a programmable integrated circuit. The inaccuracies may be due to the fact that the large number of delay elements in the large circuits reduces the degree to which individual speed parameters affect the total delay of such large circuits. The fact that a low number of speed parameters may be measured is due to the large size of the delay measuring circuits, which results in only a limited number of such circuits being includable in a programmable integrated circuit, and thus only a limited number of speed parameters (e.g., PIP-contexts, discussed below) that can be measured. For these reasons, improved techniques for measuring speed parameters of programmable integrated circuits are needed.

Thus, examples disclosed herein include techniques for characterizing the speed of interconnects within a programmable integrated circuit. Programmable integrated circuits generally include multiple programmable "tiles" that perform different functions. The tiles are connected with interconnects. The interconnects are coupled to programmable interconnect elements or points ("PIPs") that selectably couple chosen interconnects together. Accurately characterizing speed of the programmable interconnect circuit involves characterizing the speed of programmable interconnect point contexts ("PIP-contexts"), which are defined by PIP-interconnect pairs and also by characteristics of connected and related portions of the interconnect fabric of the programmable integrated circuit. Accurately characterizing the speed of these PIP-contexts is an important part of the process of designing circuits to be configured into the programmable integrated circuits.

A ring oscillator circuit is disclosed herein that includes an interconnect resource of interest as well as minimal additional interconnect resources that form a ring oscillator with an AND gate. A counter circuit is attached to the output of the AND gate and counts the number of times the ring oscillator oscillates in a given period of time. This count, along with knowledge of the amount of time during which the enable signal for the ring oscillator is asserted, helps to determine the speed of the interconnect resource of interest.

FIG. 1A illustrates an integrated circuit 160 (also referred to as a "programmable integrated circuit"), according to an example. Integrated circuit ("IC") 160 includes a large number of different programmable tiles including multi-gigabit transceivers ("MGTs") 161, configurable logic blocks ("CLBs") 162, random access memory blocks ("BRAMs") 163, input/output blocks ("IOBs") 164, configuration and clocking logic ("CONFIG/CLOCKS") 165, digital signal processing blocks ("DSPs") 166, specialized input/output blocks ("I/O") 167 (e.g., configuration ports and clock ports), and other programmable logic 168 such as digital clock managers, analog-to-digital converters, system monitoring logic, and so forth. The IC 160 may include a field programmable gate array ("FPGA") architecture. IC 160 also includes a dedicated processor, also referred to as a "processing system" or "PROC" 170.

Optionally, each programmable tile includes a programmable interconnect element ("INT") 171 (also referred to herein as a "programmable interconnect point" or "PIP") having standardized connections to and from a corresponding interconnect element in other tiles. The programmable interconnect elements taken together implement the programmable interconnect structure for the illustrated IC 160. The programmable interconnect element 171 also includes the connections to and from the programmable logic element within the same tile, as shown by the examples included at the top of FIG. 1A.

For example, a CLB 162 can include a configurable logic element ("CLE") 172 that can be programmed to implement user logic plus a single programmable interconnect element ("INT") 171. A BRAM 163 can include a BRAM logic element ("BRL") 173 in addition to one or more programmable interconnect elements 171. Typically, the number of interconnect elements 171 included in a tile depends on the height of the tile. In the pictured IC 160, a BRAM tile 163 has the same height as five CLBs 162, but other numbers (e.g., four) can also be used. A DSP tile 166 can include a DSP logic element ("DSPL") 174 in addition to an appropriate number of programmable interconnect elements 171. An IOB 164 can include, for example, two instances of an input/output logic element ("IOL") 175 in addition to one instance of the programmable interconnect element 171. The programmable interconnect elements 171 are selectively coupled to interconnects 176, which are conductors that traverse one or more tiles. As will be clear to those of skill in the art, the actual I/O pads connected, for example, to the I/O logic element 175 typically are not confined to the area of the input/output logic element 175.

In the pictured IC 160, a horizontal area near the center of the die is used for configuration, clock, I/O 167, and other control logic. Vertical columns 169 extending from this horizontal area or column are used to distribute the clocks and configuration signals across the breadth of the IC 160.

Optionally, IC 160 includes additional logic blocks that disrupt the regular columnar structure making up a large part of the IC. The additional logic blocks can be programmable blocks and/or dedicated logic. For example, processor block 170 spans several columns of CLBs and BRAMs.

PROC 170 can be implemented as a hard-wired processor that is fabricated as part of the die that implements the programmable circuitry of the IC 160 and does not include the programmable tiles included within the PL domain. PROC 170 can represent any of a variety of different processor types and/or systems ranging in complexity from an individual processor, e.g., a single core capable of executing program code, to an entire processor system having one or more cores, modules, co-processors, interfaces, or the like.

In a more complex arrangement, for example, PROC 170 can include one or more cores, e.g., central processing units, cache memories, a memory controller, unidirectional and/or bidirectional interfaces configurable to couple directly to I/O pins, e.g., I/O pads, of the IC 160 and/or couple to the programmable circuitry of the IC 160. The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC 160. For example, portions shown in FIG. 1A that are external to PROC 170 can be considered part of the, or the, programmable circuitry of the IC 160.

Note that FIG. 1A is intended to illustrate only an exemplary IC 160 architecture. For example, the numbers of logic blocks in a row, the relative width of the rows, the number and order of rows, the types of logic blocks included in the rows, the relative sizes of the logic blocks, and the interconnect/logic implementations included at the top of FIG. 1A are purely exemplary. For example, in an actual IC 160 more than one adjacent row of CLBs 162 is typically included wherever the CLBs 162 appear, to facilitate the efficient implementation of user logic, but the number of adjacent CLB 162 rows varies with the overall size of the IC 160.

Part of the process of designing circuit models for configuration into programmable integrated circuits such as integrated circuit 160 is characterizing the speed of the integrated circuit 160. One aspect of speed is related to the programmable interconnect elements 171. More specifically, because signals propagate between the various components of integrated circuit 160 via the PIPs 171, it is beneficial to have accurate knowledge of the speed with which signals propagate through PIPs 171. Moreover, while simulation software may store estimated speed data for the PIPs 171, variation among physical programmable integrated circuits 160 means that obtaining accurate information regarding the speed of PIPs 171 of any particular physical programmable integrated circuit 160 is important.

Figure 1B:
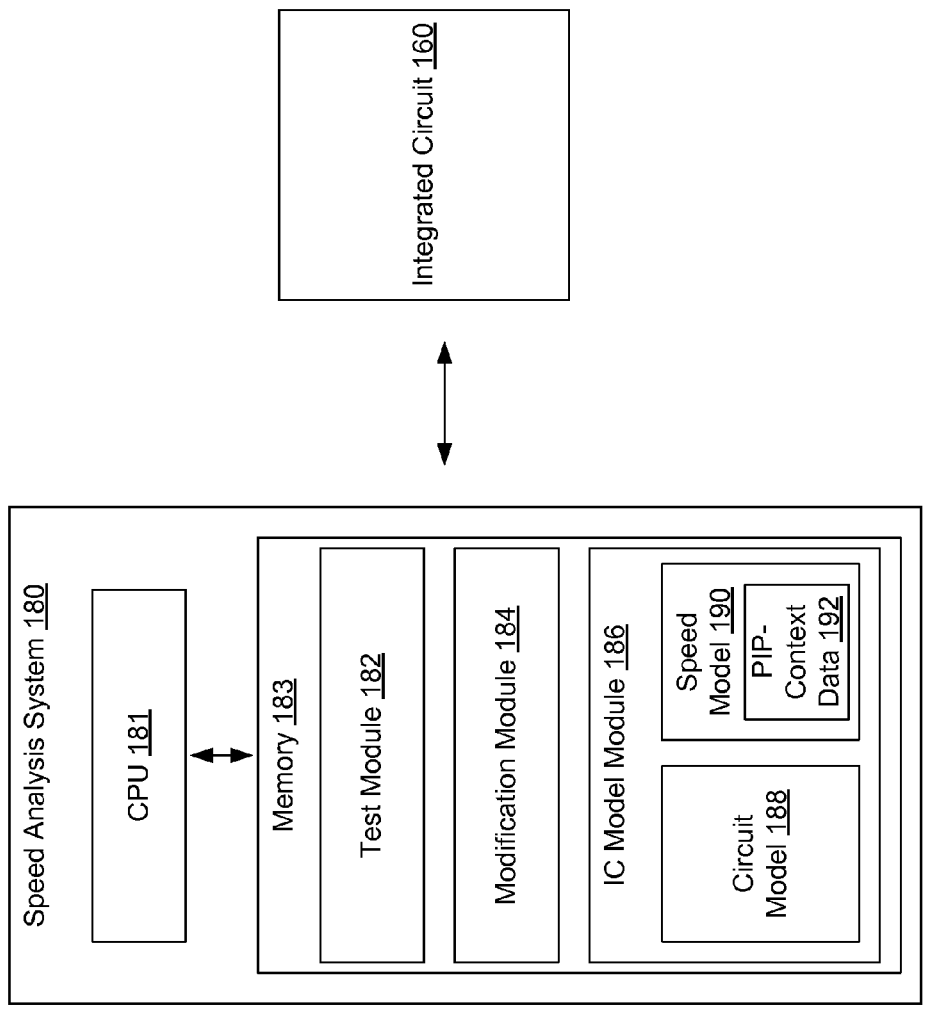
FIG. 1B is an illustration of a speed analysis system for obtaining speed data related to PIPs of a programmable integrated circuit, according to an example.

FIG. 1B is an illustration of a speed analysis system 180 for obtaining speed data related to PIPs 171 of a programmable integrated circuit 160, according to an example. As shown, the speed analysis system 180 includes a central processing unit ("CPU") 181 coupled to a memory 183. The CPU 181 executes instructions stored in the memory 183. The memory 183 stores data and instructions for execution by CPU 181. The speed analysis system 180 is in communication with IC 160. Speed analysis system 180 may include additional computer components such as bridges, non-volatile storage, input/output devices, and the like.

Although shown as a computer with CPU 181 and memory 183, in various alternative embodiments, the speed analysis system 180 may be any device capable of performing the operations described herein. In one example, speed analysis system 180 may be an application specific integrated circuit ("ASIC"). Speed analysis system 180 may be implemented in various other technically feasible manners.

The memory 183 includes (e.g., as executable computer code) a test module 182, a modification module 184, and an IC model module 186. Test module 182 communicates with integrated circuit 160 to test the speed of PIPs 171 and interconnects 176 within integrated circuit 160 via speed measuring circuits described in FIG. 2B. Modification module 184 updates an IC model stored in IC model module 186 to include the speed measuring circuits for configuration into IC 160. IC model module 186 stores the IC model 188 and configures the stored IC model 188 into the integrated circuit 160. IC model module 186 also stores a speed model which includes data regarding the speed of the PIPs 171 for the integrated circuit 160 being configured. By measuring the speed measuring circuits programmed into the integrated circuit 160, test module 182 is able to update the speed model 190 to more accurate reflect the speed of the PIPs 171 within integrated circuit 160.

Testing the speed of the PIPs 171 is a relatively complex process due to the large amount of configurability associated with the PIPs 171. More specifically, each PIP 171 is selectively connected to various interconnects 176 that travel through one or more tiles of IC 160. (Each PIP 171 can be thought of as a multiplexor that selects from one or more inputs for transmission to one or more outputs, and each interconnect 176 can be thought of as a conductor that transmits signals across one or more tiles.) The speed of each PIP 171 is dependent on various aspects that contribute to the context in which the PIP 171 is used (a "PIP-context"). Thus to get an accurate picture of the speed of the PIPs 171 of a particular IC 160, speed analysis system 180 tests the speeds associated with a wide variety of different PIP-contexts. Based on these tests, speed analysis system 180 updates speed model 190 with PIP-context data 192, which includes data indicating the speed of various PIP-contexts.

Figure 2A:
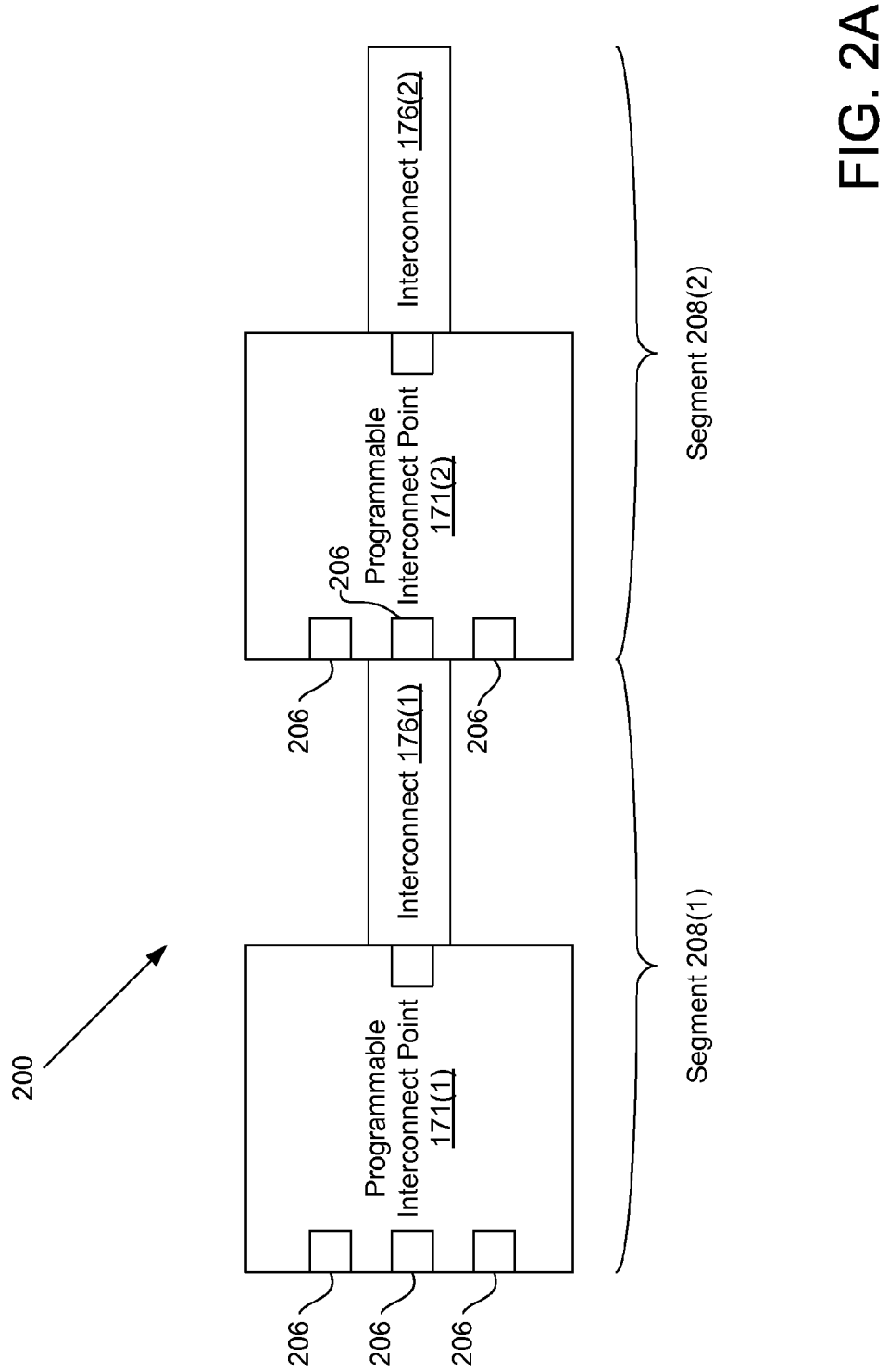
FIG. 2A is an illustration of a PIP-context, according to an example.

FIG. 2A is an illustration of a PIP-context 200, according to an example. As shown, the PIP-context 200 includes a first segment 208(1) and a second segment 208(2). The first segment includes a first PIP 171(1) and a first interconnect 176(1). The second segment 208(2) includes a second PIP 171(2) and a second interconnect 176(2). Herein, the first PIP 171(1) may be referred to as a "pre-driver PIP" and the first interconnect 176(1) may be referred to as a "pre-driver interconnect." The second PIP 171(2) may be referred to herein as a "driver PIP" and the second interconnect 176(2) may be referred to herein as a "driver interconnect."

Note that although two PIPs 171 are illustrated in FIG. 2A, the PIP-context 200 is a construct for testing the speed of the second PIP 171(2) and the second interconnect 176(2), rather than the first PIP 171(1) and/or first interconnect 176(1). The reason that the first PIP 171(1) and first interconnect 176(1) are included in PIP-context 200 is that these elements, along with the second interconnect 176(2), affect the speed of the second PIP 171(2). In other words, the context in which the second PIP 171(2) is used includes the PIP 171 that provides the signal that drives the interconnect 176 that drives the second PIP 171(2). If the speed of the first segment 208(1) was desired, then that segment 208(1) would have to be placed in a different PIP-context 200 with a different pre-driver PIP and pre-driver interconnect.

In more complete terms, a PIP-context 200 includes the following characteristics: the type of the driver PIP 171(2), the type of the driver interconnect 176(2), the type of the pre-driver interconnect 176(1), the type of the pre-driver PIP 171(1), the tile types crossed by the pre-driver interconnect 176(1), the tile types crossed by the driver interconnect 176(2), a slew bin for a PIP partial context, a capacitor bin for the PIP partial context, and the dominant metal layer. As stated above, the speed for each of a variety of PIP-contexts, each with different characteristics, may be stored in PIP-context data 192 (FIG. 1B). These characteristics are now described in greater detail.

The types of the driver PIP 171(2) and the pre-driver PIP 171(1) indicate how many inputs these PIPs 171 have. For example, both driver PIP 171(2) and pre-driver PIP 171(1) may have 3 inputs, 2 inputs, 4 inputs, and so on. In other examples, driver PIP 171(2) and pre-driver PIP 171(1) may have different numbers of inputs. The type of the driver PIP 171(2) and pre-driver PIP 171(1) may also include the number of outputs those PIPs 171 have.

The types of the driver interconnect 176(2) and the pre-driver interconnect 176(1) indicate how many tiles the interconnects 176 cross. For example, the type of the driver interconnect 176(2) may indicate that that interconnect 176(2) crosses one tile, two tiles, four tiles, five tiles, and so on. Similarly, the type of the pre-driver interconnect 176(1) may indicate that that interconnect 176(1) crosses one tile, two tiles, four tiles, five tiles, and so on.

The tile types crossed by the pre-driver interconnect 176(1) and the driver interconnect 176(2) indicate which of the tile types discussed with respect to FIG. 1A are crossed by the interconnects 176(1). In one example, the pre-driver interconnect 176(1) crosses a CLB 162 tile and a BRAM 163 tile. This defines one tile type. In another example, the pre-driver interconnect 176(1) crosses a DSP 166 tile and a CLB 162 tile. This defines another tile type.

The slew bin for a PIP partial context indicates a "bin" or grouping that characterizes the slew rate of the PIP partial context associated with the PIP-context 200 of FIG. 2A. A PIP partial context comprises the following parameters: types of pre-driver PIP 171(1) and driver PIP 171(2) and tile types crossed by the pre-driver interconnect 176(1) and the driver interconnect 176(2). Each PIP partial context has a characteristic slew rate at the input of the driver PIP 171(2). This slew rate characterizes the rate at which the output voltage of the driver PIP 171(2) changes in response to a change in input voltage. The term "slew bin" or "slew rate bin" refers to the range of values or the "bin" in which a particular slew rate value belongs. The ranges of values that correspond to the different bins may be chosen in any technically feasible manner. The slew bin for the PIP partial context indicates which of these bins the slew rate associated with the PIP partial context should be included in. Slew values may be determined by modeling and/or simulation of the PIP partial context.

The capacitor bin for the PIP partial context is the bin for the capacitance "seen" by the output of the driver PIP 171(2), within the PIP partial context associated with the PIP-context being analyzed. As with the slew bin, the capacitor bin is a range of values in which the capacitance of driver PIP 171(2) is placed. As with slew values, this value can be obtained via modeling and/or simulation of the PIP partial context.

The dominant metal layer is the metal layer through which the majority of the pre-driver interconnect 176(1) and the driver interconnect 176(2) pass. These metal layers refer to the metallization layers that the IC 160 is built from. More specifically, as is generally known in the art, integrated circuits are fabricated layer-by-layer, where some of the layers may be metal layers. The "dominant metal layer" characteristic describes which metal layer the majority of the pre-driver interconnects 176(1) and the driver interconnects 176(2) pass through.

Figure 2B:
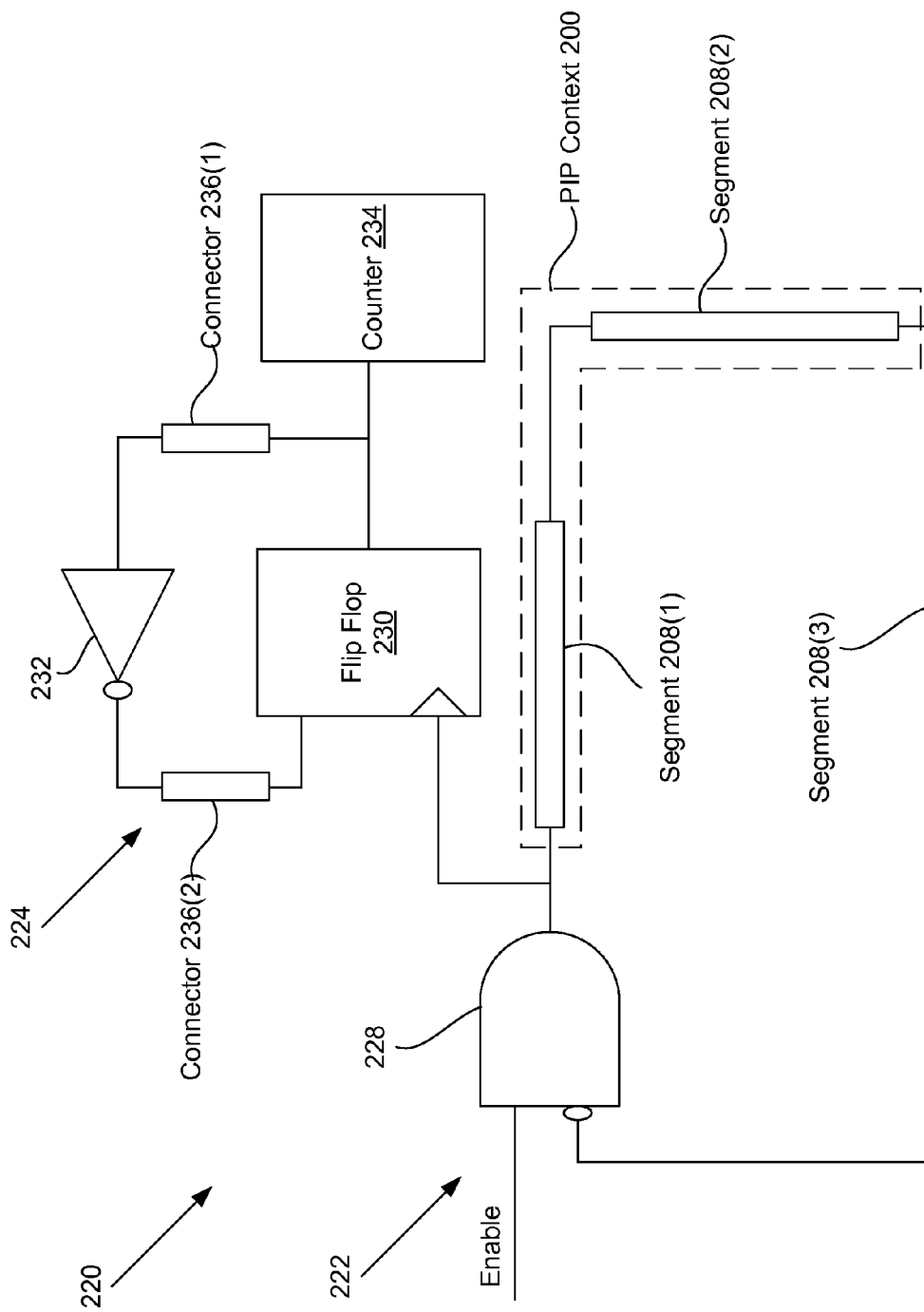
FIG. 2B is an illustration of a speed measuring circuit for measuring the speed of a PIP context, according to an example.

FIG. 2B is an illustration of a speed measuring circuit 220 for measuring the speed of a PIP context 200, according to an example. As shown, the speed measuring circuit 220 includes a ring oscillator 222 and a counter circuit 224. The ring oscillator 222 includes an AND gate 228 with an inverting input coupled to a first segment 208(1), which is coupled to a second segment 208(2), which is coupled to a third segment 208(3), which is coupled to the inverting input of the AND gate 228. The AND gate 228 and segments 208 are coupled together in a ring formation. Note that in some embodiments, the AND gate may be an "AND2i" gate with one input inverted. Additionally, the AND2i gate may be configured to have the lowest or one of the lowest delays possible of similar gates within IC 160. The PIP-context 200 to be measured is formed from the first segment 208(1) and the second segment 208(2). The third segment 208(3) is present to form the rest of the ring oscillator 222 (i.e., to "close the circuit"). The counter circuit 224 includes a flip flop 230 and an inverter 232, coupled in a ring formation via connector 236(1) and connector 236(2). The output of the flip flop 230 is coupled to a counter 234 which records the number of times that the value stored in flip flop 230 changes from 0 to 1 and back. The counter 234 may be reset whenever the speed measuring circuit 220 is enabled for measuring the speed of PIP context 200.

The non-inverting input of the AND gate 228 carries an enable signal to the ring oscillator 222. When the enable signal is asserted, the ring oscillator 222 passes an oscillating signal. More specifically, the output of the AND gate 228 flows through the segments 208 to the inverting input of the AND gate 228, which reverses the output of the AND gate 228. The speed with which the signal propagates around the ring oscillator 222 depends on the delay through the segments 208 and the AND gate 228. The delay can be expressed in mathematical terms as follows:

$$dr=dr1+dr2+dr3+dr4$$

where:
dr=delay of the ring oscillator 222
dr1=delay across segment 208(1)
dr2=delay across segment 208(2)
dr3=delay across segment 208(3)
dr4=delay across AND gate 228

The speed of the ring oscillator 222—that is, the delay dr that a signal takes to propagate once around the ring oscillator 222—can be determined by asserting the enable signal of the AND gate 228 for a fixed period of time and counting the number of times the output of the AND gate 228 in the ring oscillator 222 oscillates between 0 and 1. This measuring is performed by a counter circuit 224 which is coupled to the output of the AND gate 228. The counter circuit 224 includes a flip flop 230 coupled via connector 236(1) to an inverter 232, which is coupled via connector 236(2) to the data input of flip flop 230, to create a ring formation. The connectors 236 are conductive elements within IC 160. The output from the AND gate 228 of the ring oscillator 222 clocks the flip flop 230 so that every rising edge, the flip flop 230 stores the output of inverter 232. Because the output of the flip flop 230 is negated by inverter 232, the stored value of flip flop 230 oscillates between 0 and 1. A counter 234 counts the number of times the flip flop 230 oscillates. The delay through all elements of the counter circuit 224 (except the counter 234) is preferably less than the total delay of the ring oscillator 222 dr.

By enabling the ring oscillator 222 for a fixed amount of time, which is referred to herein as a "total enable time," and by obtaining the count of the number of times that the flip flop 230 oscillates in that period of time, referred to herein as the "total oscillator count," the speed of the ring oscillator 222 can be calculated as the total enable time divided by the total oscillator count.

Performing the speed test operations described above obtains an overall delay for the constructed ring oscillator 222 (dr), but does not necessarily obtain a delay for the specific segment of interest—segment 208(2). To obtain the delay for that segment, modification module 184 (FIG. 1B) can modify circuit model 188 to include multiple ring oscillators 222 with different PIP-contexts 200, and test module 182 (FIG. 1B) can obtain and compare the results. The various ring oscillator 222 can include some segments that are the same, but also some segments that are different. This allows test module 182 to compare the different delays associated with the different ring oscillators 222 that result from making various modifications to individual segments 208. In one example, test module 182 can build a system of equations based on the various results received and can evaluate the system of equations to determine delays for the individual segments 208. For illustration, a simplified example of a system of equations is now provided.

In one example, modification module 184 (FIG. 1B) modifies a circuit model 188 to include four speed testing circuits 220 with four different ring oscillators 222. The first ring oscillator 222 includes a segment s1 with a first delay d1, a segment s2 with a second delay d2, and a third delay d3, as well as an AND gate 228 which has delay $d_{AND}$. The second ring oscillator 222 includes a segment s1, which has the same segment type as the segment s1 of the first ring oscillator, a segment s3 with the third delay d3, and a segment s4 with a fifth delay d4, as well as the AND gate 228. The third ring oscillator 222 includes a segment s2, which has the same segment type as the segment s2 of the first ring oscillator 222, a segment s3, which has the same segment type as segment s3 of the first ring oscillator 222, and a segment s4 which has the same segment type as the segment s4 of the second ring oscillator 222. The fourth ring oscillator 222 includes a segment s1, which has the same segment type as the segment s1 of the first ring oscillator 222, a segment s2, which has the same segment type as segment s2 of the first ring oscillator 222, and a segment s4 which has the same segment type as the segment s4 of the second ring oscillator 222. The IC model module 186 configures the IC 160 with these four ring oscillators 222 and the test module 182 obtains results represented as follows (where do1, do2, and do3 are the delays of the first, second, and third ring oscillators 222, respectively, and $d_{AND}$ is the delay of the AND gate 228):

$$do1=d1+d2+d3+d_{AND}$$

$$do2=d1+d3+d4+d_{AND}$$

$$do3=d2+d3+d4+d_{AND}$$

$$do4=d1+d2+d4+d_{AND}$$

Test module 182 may algebraically solve this system of equations to obtain values for the different segments. Speed analysis system 180 may configure, into integrated circuit 160, any number of speed testing circuits 220 and solve resulting systems of equations to obtain associated delay values for the different segments 208. Alternatively or additionally, test module 182 may use statistical techniques or any other techniques to obtain delay data for individual segments 208.

Speed analysis system 180 may use the above techniques to characterize any number of PIP-contexts 200 of any particular physical IC 160. Thus, speed analysis system 180 may repeatedly configure into IC 160 and test any number of different speed testing circuits 220 that include different PIP-contexts for which speed data is desired. At any one time, speed analysis system 180 may configure any number of speed testing circuits 220 into an integrated circuit 160 and may test those speed testing circuits 220 simultaneously or one-by-one.

Because the number of possible PIP-contexts 200 may be very large, speed analysis system 180 may use a PIP-context classification technique to reduce the number of PIP-contexts 200 for which speed data is to be collected. This PIP-context classification technique generally includes using approximate, simulated PIP-context speed data to generate groups of PIP-contexts that have approximately similar delays, and choosing a representative of each PIP-context group for programming into an actual IC 160 for testing by speed analysis system 180.

To form these groupings, speed analysis system 180 selects a number of PIP-context characteristics (discussed above with respect to FIG. 2A) and identifies all PIP-contexts that have the same values for each of the selected characteristics. For example, speed analysis system 180 may select the characteristics of PIP type, driver interconnect type, and pre-driver interconnect type. Each group would include all PIP-contexts 200 (i.e., combinations of PIP-context characteristics) that have the same values for those selected characteristics. Speed analysis system 180 can statistically analyze the stored delay values for the PIP-contexts in each group, calculating means and standard deviations for the PIP-contexts in each group. If the standard deviation is below a threshold for all groups, then speed analysis system 180 deems the groupings to be adequate and if the standard deviation is not below a threshold for all groups, then speed analysis system 180 chooses different characteristics from which to form groups. This technique is repeated until the groups are deemed to be adequate. At this point, the speed analysis system 180 chooses a representative PIP-context from each group, generates a speed measuring circuit 220 that includes one or more representative PIP-contexts, configures the IC 160 with the speed measuring circuits 220, enables each of the speed measuring circuits 220, and measures the speed of each ring oscillator 222 in the speed measuring circuits 220.

The small size of the speed measuring circuit 220 means that speed measurements for a relatively large number of PIP-contexts may be taken. The small size also means that the speed of specific PIP-contexts can be obtained with a high precision that with previous speed measurement circuits, because the PIP-contexts occupy a larger portion of the speed measurement circuits.

Figure 3:
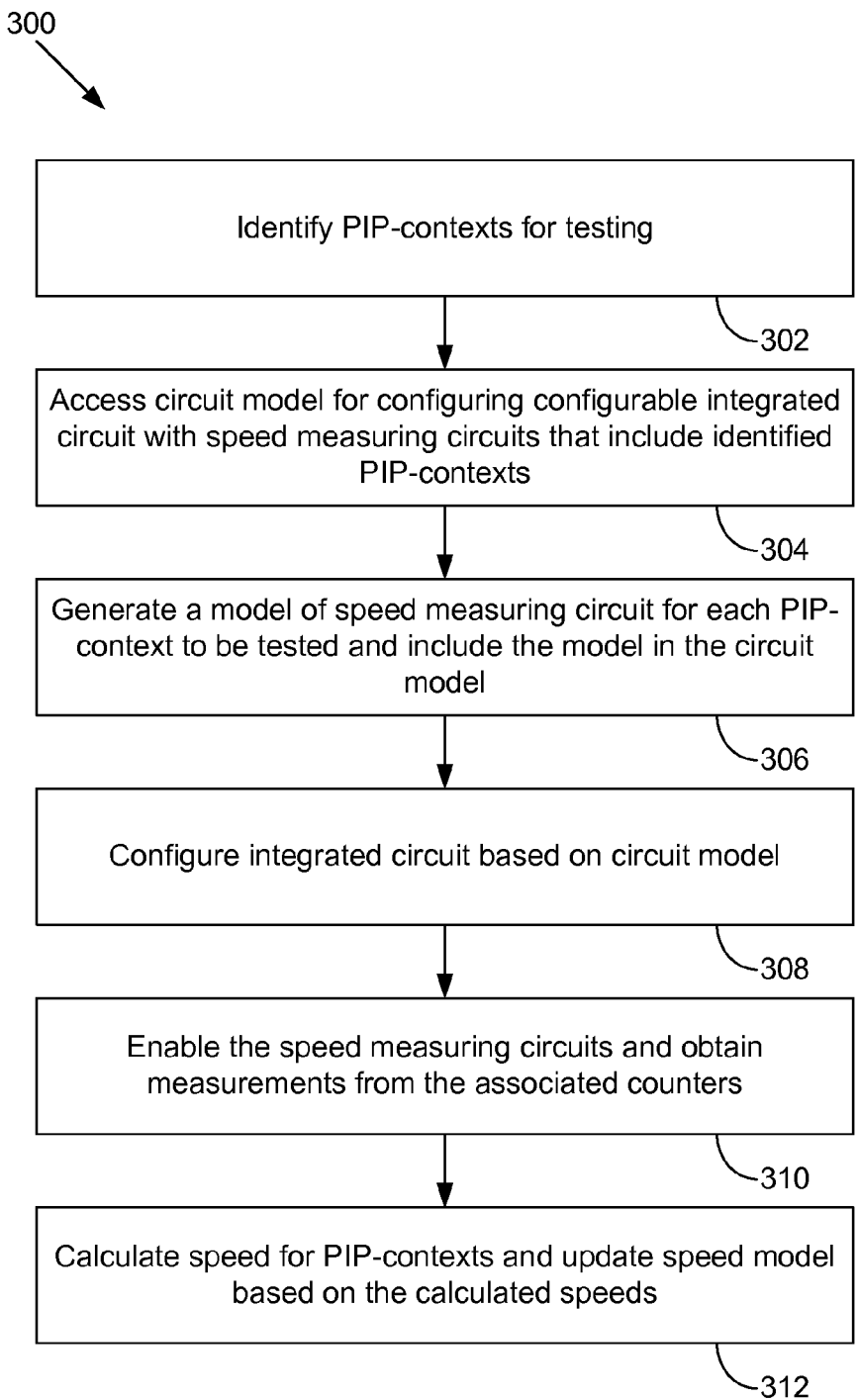
FIG. 3 is a flow diagram of method operations for obtaining speed measurements for a programmable integrated circuit, according to an example.

FIG. 3 is a flow diagram of method operations for obtaining speed measurements for a programmable integrated circuit, according to an example. Although described in conjunction with the system of FIGS. 1A-2B, those of skill in the art will realize that any entity that performs the operations, in any technically feasible order, would be within the scope of the present disclosure.

As shown, a method 300 begins at operation 302, where test module 182 identifies PIP-contexts 200 for testing. Identifying PIP-contexts 200 simply involves identifying collections of characteristics that define PIP-contexts 200 as discussed above. As also discussed above, PIP-contexts 200 may be divided into groups and test module 182 may select a representative PIP-context 200 for each group to test. Test module 182 may alternatively test each possible PIP-context 200, selecting one or more PIP-contexts to configure into IC 160 based on how many associated speed measuring circuits 220 will fit into IC 160 and which PIP-contexts 200 have already been tested. At operation 304, modification module 184 accesses the circuit model 188 for editing.

At operation 306, modification module 184 generates models for the speed measuring circuits 220 for the identified PIP-contexts and adds those models to circuit model 188. Modification module 184 modifies circuit model 188 to include a model of a particular speed measuring circuit 220 as follows. Modification module 184 identifies a CLB that can implement an AND gate. Speed measuring circuit 220 also identifies two PIPs 171 and two interconnects 176 to act as the PIP-context 200, and a third PIP 171 and a third interconnect 176 to act as the third segment 208 for connection to the AND gate. Modification module 184 also identifies a flip-flop and a CLB that can implement an inverter as well as two connectors 236 to act as the counter circuit 224. Modification module 184 identifies logic that can act as the counter 234. Modification module 184 modifies the circuit model 188 to include these identified elements coupled together as illustrated in FIG. 2B.

At operation 308, IC model module 186 configures IC 160 based on circuit model 188. At operation 310, test module 182 enables the speed measuring circuits 220 for a certain amount of time and obtains measurements from each of the speed measuring circuits 220. At operation 312, test module 182 calculates speed for the PIP-contexts based on the measurements and updates the speed model 190 accordingly. Updating the speed model 190 involves adding speed entries for each PIP-context 200 that describes the speed of each PIP-context 200.

Note that although various specific logic gates are described herein, those of skill in the art will recognize that other logic gates may or electrical components that perform an analogous function may instead be substituted.

Although signals are sometimes described herein as having a particular logical value—i.e., high or low (or "0" or "1" or some equivalent), those of skill in the art will recognize that for any particular signal, polarities may be reversed. For example, a signal that, when brought high, has a particular effect, may alternatively have that particular effect when brought low.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more example implementations may be useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various examples described herein may be practiced with other computer system configurations including handheld devices, microprocessor systems, microprocessor-based or programmable consumer electronics, minicomputers, mainframe computers, and the like.

One or more examples may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a Compact Disc (CD)-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific example implementations, other and further example implementations may be devised without departing from the basic scope thereof, and the scope thereof is determined by the claims that follow.

What is claimed is:

1. A speed measurement circuit for measuring speed parameters of a programmable integrated circuit comprising:
   a ring oscillator configured in the programmable integrated circuit, the ring oscillator including:
      an AND gate with an inverting input and a non-inverting input,
      a programmable interconnect point context (PIP-context) having a first programmable interconnect point (PIP), a first interconnect, a second PIP, and a second interconnect coupled in series, and
      a third interconnect and a third PIP coupled in series with the PIP-context and with an inverting input of the AND gate; and
   a counter circuit coupled to an output of the AND gate and configured in the programmable integrated circuit.

2. The speed measurement circuit of claim 1, wherein:
   the AND gate is included within a configurable logic element (CLE) of the programmable integrated circuit.

3. The speed measurement circuit of claim 1, wherein the counter circuit comprises:
   a flip-flop coupled in series with a first connector, an inverter, a second connector, and a data input of the flip-flop to create a ring formation,
   wherein the flip-flop, the first connector, the inverter, and the second connector are included within the programmable integrated circuit.

4. The speed measurement circuit of claim 1, wherein the PIP-context is defined at least in part by the characteristics of a type of the first PIP, a type of the second PIP, a type of the first interconnect, and a type of the second interconnect.

5. The speed measurement circuit of claim 1, wherein:
   the first PIP is operable to select among a first series of inputs for output to the first interconnect; and
   the second PIP is operable to select among a second series of inputs for output to the second interconnect.

6. The speed measurement circuit of claim 1, wherein:
   the first interconnect comprises a first conductive element coupled to carry signals across a first number of tiles; and
   the second interconnect comprises a second conductive element coupled to carry signals across a second number of tiles.

7. The speed measurement circuit of claim 1, further comprising:
   a second ring oscillator configured in the programmable integrated circuit having a second PIP-context,
   wherein the first PIP-context has at least one characteristic that is different than the first PIP-context and at least one characteristic that is the same as the first PIP-context.

8. A speed analysis system for characterizing speed of a programmable integrated circuit, the speed analysis system comprising:
   a central processing unit (CPU) coupled to a memory storing instructions for execution of an integrated circuit model module, a modification module, and a test module by the CPU,
   wherein the integrated circuit model module is operable to store a circuit model for configuring in the programmable integrated circuit and to store a speed model that includes data characterizing speed of programmable interconnect point contexts (PIP-contexts) associated with the programmable integrated circuit,
   wherein the modification module is operable to generate a first model of a speed measuring circuit for configuration into the programmable integrated circuit and to store the first model in the circuit model, wherein the test module is operable to measure speed of a first PIP-context associated with the first model when the first model is configured into the integrated circuit, and wherein the speed measuring circuit comprises:
a ring oscillator configured in the programmable integrated circuit, the ring oscillator including:
an AND gate with an inverting input and a non-inverting input,
the first PIP-context, having a first programmable interconnect point (PIP), a first interconnect, a second PIP, and a second interconnect coupled in series, and
a third interconnect and a third PIP coupled in series with the PIP-context and with an inverting input of the AND gate; and
a counter circuit coupled to an output of the AND gate and configured in the programmable integrated circuit.

9. The speed analysis system of claim 8, wherein:
the AND gate is included within a configurable logic element (CLE) of the programmable integrated circuit.

10. The speed analysis system of claim 8, wherein the counter circuit comprises:
a flip-flop coupled in series with a first connector, an inverter, a second connector, and a data input of the flip-flop to create a ring formation,
wherein the flip-flop, the first connector, the inverter, and the second connector are included within the programmable integrated circuit.

11. The speed analysis system of claim 8, wherein the PIP-context is defined at least in part by the characteristics of a type of the first PIP, a type of the second PIP, a type of the first interconnect, and a type of the second interconnect.

12. The speed analysis system of claim 8, wherein:
the first PIP is operable to select among a first series of inputs for output to the first interconnect; and
the second PIP is operable to select among a second series of inputs for output to the second interconnect.

13. The speed analysis system of claim 8, wherein:
the first interconnect comprises a first conductive element coupled to carry signals across a first number of tiles; and
the second interconnect comprises a second conductive element coupled to carry signals across a second number of tiles.

14. The speed analysis system of claim 8, wherein:
the modification module is further operable to generate an array of speed measuring circuits that includes a second model of a second speed measuring circuit for configuration into the programmable integrated circuit and to store the second model in the circuit model, wherein the second model includes a second PIP-context with at least one characteristic that is different than the first PIP-context and at least one characteristic that is the same as the first PIP-context;
the IC model module is further operable to configure the second model into the integrated circuit; and
the test module is operable to measure speed of the first PIP-context by measuring a first speed associated with the first speed measuring circuit, measuring a second speed associated with the second speed measuring circuit, and comparing the first speed to the second speed to determine the speed of the first PIP-context.

15. The speed analysis system of claim 8, wherein the modification module is further operable to:
group PIP-contexts into PIP-context groups based on simulated delays of the PIP-contexts; and
select only one PIP-context from each of one or more PIP-context groups for inclusion in the circuit model.

16. The speed analysis system of claim 8, wherein the test module is operable to measure speed of the first PIP-context by:
asserting an enable signal at the non-inverting input of the AND gate for a total enable time;
reading a count value from the counter circuit; and
dividing the total enable time by the count value to obtain a ring oscillator delay.

17. The speed analysis system of claim 16, wherein the test module is further operable to:
obtain multiple ring oscillator delays for multiple PIP-contexts; and
construct a system of equations based on the ring oscillator delays and delay elements within respective speed measurement circuits to obtain delay values for the multiple PIP-contexts.

18. A method for measuring speed parameters of a programmable integrated circuit comprising:
generating a first model of a speed measuring circuit;
configuring the first model into the programmable integrated circuit; and
measuring speed of a first PIP-context associated with the first model,
wherein the speed measuring circuit comprises:
a ring oscillator configured in the programmable integrated circuit, the ring oscillator including:
an AND gate with an inverting input and a non-inverting input,
the first PIP-context, having a first programmable interconnect point (PIP), a first interconnect, a second PIP, and a second interconnect coupled in series, and
a third interconnect and a third PIP coupled in series with the PIP-context and with an inverting input of the AND gate; and
a counter circuit coupled to an output of the AND gate and configured in the programmable integrated circuit.

19. The method of claim 18, further comprising:
grouping PIP-contexts into PIP-context groups based on simulated delays of the PIP-contexts; and
selecting only one PIP-context from each of one or more PIP-context groups for inclusion in the circuit model.

20. The method of claim 17, wherein measuring speed of the first PIP-context comprises:
asserting an enable signal at the non-inverting input of the AND gate for a total enable time;
reading a count value from the counter circuit; and
dividing the total enable time by the count value to obtain a ring oscillator delay.

* * * * *